(12) United States Patent
Dalce

(10) Patent No.: US 9,864,745 B2
(45) Date of Patent: Jan. 9, 2018

(54) UNIVERSAL LANGUAGE TRANSLATOR

(71) Applicant: Reginald Dalce, Boynton Beach, FL (US)

(72) Inventor: Reginald Dalce, Boynton Beach, FL (US)

(*) Notice: Subject to any disclaimer, the term of this patent is extended or adjusted under 35 U.S.C. 154(b) by 0 days.

(21) Appl. No.: 14/926,698

(22) Filed: Oct. 29, 2015

(65) Prior Publication Data
US 2016/0048508 A1    Feb. 18, 2016

Related U.S. Application Data

(63) Continuation of application No. 13/559,346, filed on Jul. 26, 2012.
(Continued)

(51) Int. Cl.
| | |
|---|---|
| G10L 21/00 | (2013.01) |
| G10L 25/90 | (2013.01) |
| G10L 13/00 | (2006.01) |
| G10L 13/06 | (2013.01) |
| G10L 15/14 | (2006.01) |
| G10L 25/00 | (2013.01) |
| G10L 15/00 | (2013.01) |
| G10L 15/04 | (2013.01) |
| G10L 15/18 | (2013.01) |
| G06F 17/28 | (2006.01) |

(Continued)

(52) U.S. Cl.
CPC ............ *G06F 17/289* (2013.01); *G10L 13/02* (2013.01); *G10L 15/005* (2013.01); *G10L 15/26* (2013.01); *G10L 21/0208* (2013.01); *G10L 13/033* (2013.01)

(58) Field of Classification Search
CPC ....... G10L 15/265; G10L 15/22; G10L 15/20; G10L 15/144; G10L 15/063; G10L 13/04; G10L 13/08; G10L 13/043; G10L 13/07; G10L 25/87; G10L 25/30; G06F 17/289; G06F 17/2872; G06F 17/2785; H05K 999/99
See application file for complete search history.

(56) References Cited

U.S. PATENT DOCUMENTS

| 4,882,681 A | 11/1989 | Brotz |
| 5,636,325 A * | 6/1997 | Farrett ............... G10L 13/10 704/231 |

(Continued)

FOREIGN PATENT DOCUMENTS

| AU | 2006201926 | 12/2006 |
| EP | 1464048 | 8/2009 |

(Continued)

*Primary Examiner* — Anne Thomas-Homescu
(74) *Attorney, Agent, or Firm* — Fish IP Law, LLP

(57) ABSTRACT

A universal language translator automatically translates a spoken word or phrase between two speakers. The translator can lock onto a speaker and filter out ambient noise so as to be used in noisy environments, and to ensure accuracy of the translation when multiple speakers are present. The translator can also synthesize a speaker's voice into the dialect of the other speaker such that each speaker sounds like they're speaking the language of the other. A dialect detector could automatically select target dialects either by auto-sensing the dialect by listening to aspects of each speaker's phrases, or based upon the location of the device.

14 Claims, 5 Drawing Sheets

Related U.S. Application Data

(60) Provisional application No. 61/513,381, filed on Jul. 29, 2011, provisional application No. 61/610,811, filed on Mar. 14, 2012.

(51) Int. Cl.
| | | |
|---|---|---|
| *G06F 17/20* | (2006.01) | |
| *G10L 13/02* | (2013.01) | |
| *G10L 15/26* | (2006.01) | |
| *G10L 21/0208* | (2013.01) | |
| *G10L 13/033* | (2013.01) | |

(56) References Cited

U.S. PATENT DOCUMENTS

| | | | |
|---|---|---|---|
| 5,818,733 A | 10/1998 | Hyuga | |
| 6,233,545 B1 | 5/2001 | Datig | |
| 6,424,937 B1* | 7/2002 | Kato | G10L 13/10 704/205 |
| 7,496,498 B2* | 2/2009 | Chu | G10L 13/08 704/2 |
| 7,596,499 B2* | 9/2009 | Anguera Miro | G10L 13/08 704/277 |
| 7,702,792 B2 | 4/2010 | Shaffer et al. | |
| 7,778,632 B2 | 8/2010 | Kurlander et al. | |
| 7,809,549 B1* | 10/2010 | Bangalore | G06F 17/289 704/2 |
| 8,073,696 B2* | 12/2011 | Kato | G10L 13/10 704/260 |
| 8,165,879 B2* | 4/2012 | Abe | G10L 15/26 704/231 |
| 8,165,882 B2* | 4/2012 | Kato | G10L 13/07 704/200 |
| 8,244,534 B2* | 8/2012 | Qian | G10L 13/06 704/243 |
| 8,275,621 B2* | 9/2012 | Alewine | G10L 13/08 704/231 |
| 8,645,140 B2* | 2/2014 | Lobzakov | G10L 13/00 379/142.17 |
| 8,887,199 B2* | 11/2014 | Van De Sluis | H04N 5/44543 725/39 |
| 2002/0069063 A1 | 6/2002 | Buchner et al. | |
| 2002/0091521 A1* | 7/2002 | Yuk | G10L 15/065 704/240 |
| 2002/0184032 A1* | 12/2002 | Hisaminato | G10L 13/06 704/268 |
| 2003/0036903 A1* | 2/2003 | Konopka | G10L 15/065 704/249 |
| 2003/0050783 A1* | 3/2003 | Yoshizawa | G10L 15/065 704/270.1 |
| 2003/0065504 A1 | 4/2003 | Kraemer et al. | |
| 2004/0044517 A1 | 3/2004 | Palmquist | |
| 2005/0065795 A1* | 3/2005 | Mutsuno | G10L 13/033 704/260 |
| 2005/0240406 A1* | 10/2005 | Carroll | G06F 3/16 704/235 |
| 2006/0004730 A1* | 1/2006 | Chan | G06F 17/3066 |
| 2006/0020463 A1* | 1/2006 | Reich | G10L 15/187 704/257 |
| 2006/0136216 A1* | 6/2006 | Shen | G10L 13/08 704/266 |
| 2006/0149558 A1* | 7/2006 | Kahn | G10L 15/063 704/278 |
| 2006/0271370 A1 | 11/2006 | Li | |
| 2007/0005363 A1* | 1/2007 | Cucerzan | H04W 4/02 704/256 |
| 2007/0033005 A1* | 2/2007 | Cristo | G06F 17/279 704/9 |
| 2007/0038436 A1* | 2/2007 | Cristo | G06F 17/273 704/9 |
| 2007/0050188 A1* | 3/2007 | Blair | G10L 13/033 704/207 |
| 2007/0097214 A1* | 5/2007 | Jung | H04N 5/76 348/207.1 |
| 2007/0233489 A1* | 10/2007 | Hirose | G10L 13/033 704/258 |
| 2007/0244688 A1* | 10/2007 | Bangalore | G06F 17/289 704/3 |
| 2008/0052069 A1* | 2/2008 | Flanagan | G06F 17/289 704/235 |
| 2008/0195375 A1 | 8/2008 | Clifton et al. | |
| 2008/0195386 A1 | 8/2008 | Proidl et al. | |
| 2008/0208597 A1* | 8/2008 | Chino | G10L 15/1822 704/277 |
| 2008/0225184 A1* | 9/2008 | Hardacker | H04N 5/4403 348/734 |
| 2009/0006525 A1* | 1/2009 | Moore | G06Q 30/02 709/202 |
| 2009/0037179 A1* | 2/2009 | Liu | G10L 13/033 704/260 |
| 2009/0048820 A1 | 2/2009 | Buccella | |
| 2009/0074203 A1* | 3/2009 | Bradford | H04R 25/552 381/94.2 |
| 2009/0074216 A1* | 3/2009 | Bradford | H04R 25/554 381/315 |
| 2009/0112590 A1* | 4/2009 | Pulz | G10L 15/187 704/246 |
| 2009/0125309 A1* | 5/2009 | Tischer | G10L 13/033 704/260 |
| 2009/0204395 A1* | 8/2009 | Kato | G10L 13/033 704/206 |
| 2009/0204405 A1* | 8/2009 | Kato | G10L 13/07 704/268 |
| 2009/0243929 A1* | 10/2009 | Sengupta | G01S 19/252 342/357.31 |
| 2009/0306985 A1* | 12/2009 | Roberts | G10L 13/043 704/258 |
| 2009/0319273 A1* | 12/2009 | Mitsui | G06F 17/30053 704/260 |
| 2010/0049497 A1* | 2/2010 | Manuel-Devadoss ("Smith") | G10L 15/26 704/3 |
| 2010/0057435 A1* | 3/2010 | Kent | G06F 17/289 704/3 |
| 2010/0075281 A1 | 3/2010 | Manuel-Devadoss | |
| 2010/0082329 A1* | 4/2010 | Silverman | G10L 15/005 704/8 |
| 2010/0100376 A1* | 4/2010 | Harrington | G10L 15/26 704/235 |
| 2010/0100907 A1* | 4/2010 | Chang | G06F 3/01 725/46 |
| 2010/0122288 A1* | 5/2010 | Minter | H04N 7/17318 725/36 |
| 2010/0145706 A1* | 6/2010 | Kato | G10L 13/10 704/266 |
| 2010/0185343 A1 | 7/2010 | Burvall et al. | |
| 2010/0198577 A1* | 8/2010 | Chen | G06F 17/289 704/2 |
| 2010/0198579 A1 | 8/2010 | Cunnington et al. | |
| 2010/0250231 A1* | 9/2010 | Almagro | G06F 17/289 704/2 |
| 2010/0293230 A1* | 11/2010 | Lai | G06F 17/289 709/206 |
| 2011/0044438 A1* | 2/2011 | Wang | H04W 4/206 379/93.02 |
| 2011/0093272 A1* | 4/2011 | Isobe | G10L 13/10 704/258 |
| 2011/0125483 A1 | 5/2011 | Manuel-Devadoss | |
| 2011/0150270 A1* | 6/2011 | Carpenter | G06Q 50/32 382/101 |
| 2011/0161076 A1* | 6/2011 | Davis | G06F 3/04842 704/231 |
| 2011/0166938 A1* | 7/2011 | Deridder | G06Q 30/0261 705/14.58 |
| 2011/0178803 A1* | 7/2011 | Petrushin | G10L 17/26 704/270 |
| 2011/0238407 A1* | 9/2011 | Kent | G06F 17/289 704/3 |

(56) References Cited

U.S. PATENT DOCUMENTS

| | | | | |
|---|---|---|---|---|
| 2011/0246172 A1* | 10/2011 | Liberman | G06F 17/289 | 704/2 |
| 2011/0257978 A1* | 10/2011 | Jannarone | G10L 15/30 | 704/500 |
| 2011/0270601 A1* | 11/2011 | Karapetian | G10L 13/00 | 704/4 |
| 2011/0313767 A1* | 12/2011 | Duffield | G10L 15/187 | 704/251 |
| 2011/0313775 A1* | 12/2011 | Laligand | H04N 21/234336 | 704/275 |
| 2012/0004899 A1* | 1/2012 | Arshi | G06Q 30/02 | 704/8 |
| 2012/0035906 A1* | 2/2012 | Jephcott | G06F 17/289 | 704/2 |
| 2012/0036529 A1* | 2/2012 | McClenny | G08B 27/005 | 725/33 |
| 2012/0062729 A1* | 3/2012 | Hart | G06F 1/1626 | 348/135 |
| 2012/0069131 A1* | 3/2012 | Abelow | G06Q 10/067 | 348/14.01 |
| 2012/0089400 A1* | 4/2012 | Henton | G10L 13/02 | 704/260 |
| 2012/0120218 A1* | 5/2012 | Flaks | G10L 21/028 | 348/77 |
| 2012/0179448 A1* | 7/2012 | Gupta | G06F 17/289 | 704/2 |
| 2012/0203557 A1* | 8/2012 | Odinak | G01C 21/3608 | 704/270.1 |
| 2012/0215532 A1* | 8/2012 | Foo | H04R 25/505 | 704/235 |
| 2012/0253781 A1* | 10/2012 | Qian | G10L 21/003 | 704/2 |
| 2012/0278081 A1* | 11/2012 | Chun | G10L 13/02 | 704/260 |
| 2013/0016760 A1* | 1/2013 | Shellhammer | H04W 16/14 | 375/146 |
| 2013/0144595 A1* | 6/2013 | Lord | G06F 17/289 | 704/2 |
| 2013/0144625 A1* | 6/2013 | Kurzweil | G10L 13/00 | 704/260 |
| 2013/0166278 A1* | 6/2013 | James | G10L 13/033 | 704/8 |
| 2013/0185052 A1* | 7/2013 | Boyd | G06F 17/28 | 704/3 |
| 2013/0325448 A1* | 12/2013 | Levien | G10L 19/00 | 704/201 |

FOREIGN PATENT DOCUMENTS

| | | |
|---|---|---|
| EP | 1495626 | 8/2009 |
| WO | 2009/042861 | 4/2009 |
| WO | 2010/025460 | 3/2010 |
| WO | 2010/062542 | 6/2010 |

* cited by examiner

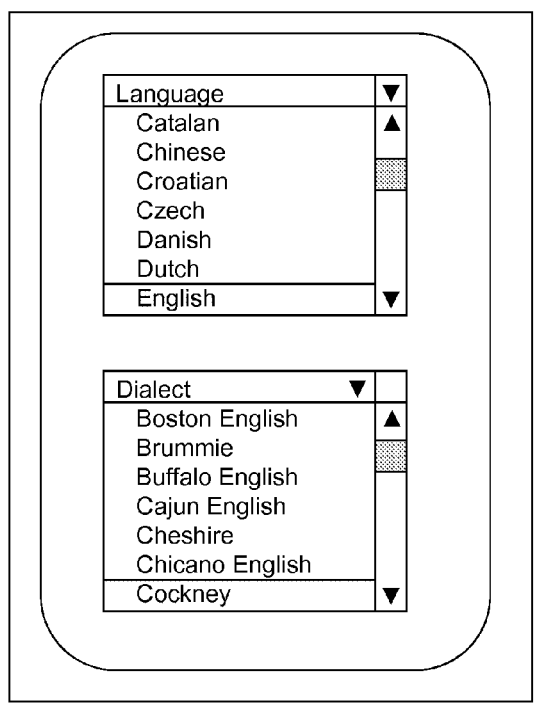 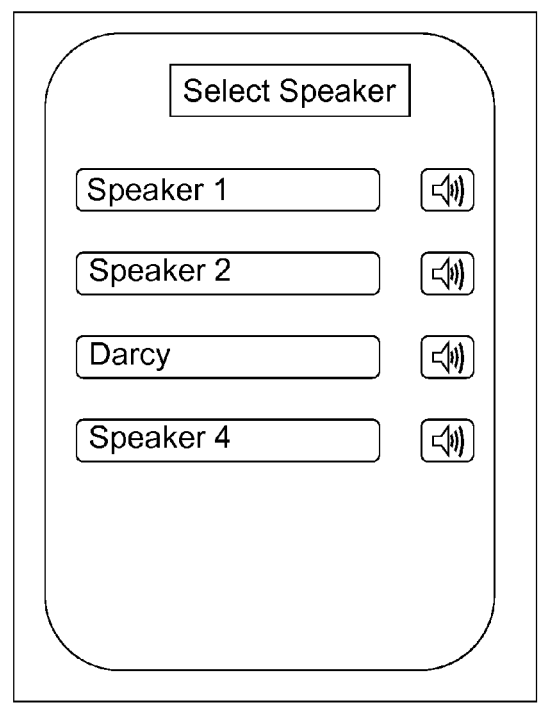
Figure 2A                    Figure 2B

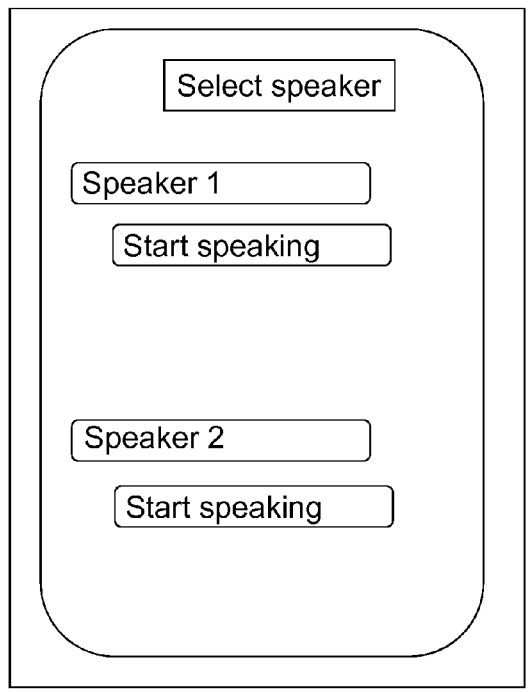
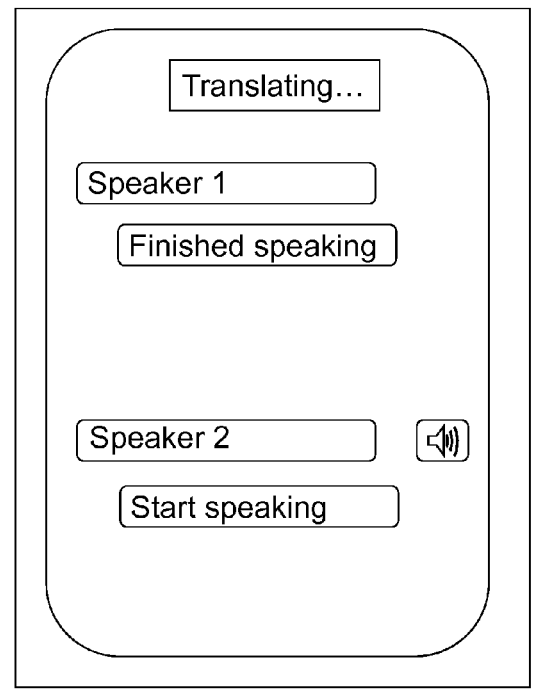
Figure 2C
Figure 2D

UNIVERSAL LANGUAGE TRANSLATOR

This application claims the benefit of priority to U.S. patent application Ser. No. 13/559,346, filed on Jul. 26, 2012, U.S. provisional application Ser. No. 61/513,381 filed on Jul. 29, 2011, and U.S. provisional application Ser. No. 61/610,811 filed on Mar. 14, 2012. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is translation devices

BACKGROUND

The problem of different people being unable to understand one another is as old as the legend of the Tower of Babylon. When a first person who speaks a first language wishes to communicate with a second person who speaks a second language, some sort of translator needs to be used. Preferably the translator is a human translator who understands both languages very well, and can translate cultural nuances from one language to another. However, many people do not have access to a human translator, and must rely upon machine translations.

There are many machine translators available for users with access to the internet. For example, the websites http://translate.google.com and http://babelfish.yahoo.com both provide relatively accurate machine translations of languages when a word or phrase is typed into a web user interface. However, not all users have access to a web user interface when they need a word or phrase translated from one language to another. In addition, some users might hear a word or phrase in a foreign language, but may not know how to accurately spell or type the word or phrase into a keyboard user interface.

U.S. Pat. No. 4,882,681 to Brotz teaches a handheld oral translating device which will listen to a phrase in one language, and will output an oral translation of the phrase through a machine speaker in the device. In this way, Brotz's device provides simultaneous translation of a conversation between a user of the device that speaks a first language, and another user of the device that speaks a second language, seamlessly performing both reception of a phrase and transmission of a translated phrase. Brotz's device, however, uses machine-synthesized phonemes to produce the translated phrase, which sounds artificial and stilted to a normal user.

US2006/0271370 to Li and WO2010025460 to Kent both teach oral translation devices that produce a translated phrase that mimics a user's voice. Kent's device requires a user to create a user-stored dictionary consisting of stored phones, diphones, triphones, half-syllables, words, and other basic sound units in order to construct any word for a target language. Li's device estimates and saves a speaker's speech characteristics, such as a speaker's pitch and timber, and then uses the saved pitch and timbre to synthesize speech. Li's device even locks onto a speaker's location so as to only translate words uttered from that speaker location. Li's device, however, fails to account for a speaker that is moving about a room, and requires a locked-on speaker to remain in one place for the duration of the translation session. Other speech translation devices, such as EP1464048 to Palmquist have the same issue.

There is also a need in the art to orally translate a phrase into a local dialect. Many older languages, such as Chinese, have localized to such an extent that people speaking different dialects of the same language frequently cannot even understand one another. Thus, when designing an oral translator, there is a need to not only to translate phrases from one language to another, but also to translate phrases to a language of a specific dialect. US20040044517, US20080195375, and WO2010062542 to Gupta each teach devices that will output a translation into a specific dialect. AU2006201926 to Rigas teaches an oral translation device that uses a GPS to determine the dialect of a region before orally translating that dialect. None of those devices, however, output a voice while mimicking a speaker's voice.

There has been a long-felt need in the art for an oral translating device that mimics a user's voice into a specific regional dialect to allow for a device that will be most akin to the speaker actually speaking in that other language, yet no such device has ever been contemplated nor created.

Thus, there is still a need for oral translation devices which mimic a user's voice into a specific dialect.

SUMMARY OF THE INVENTION

The inventive subject matter provides apparatus, systems and methods in which one can use a translator device to automatically translate a phrase spoken by a user into a specific dialect that mimics properties of the user's voice.

It should be noted that while the following description is drawn to a single handheld computer device that translates speech, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The device could have a voice recognition module that detects phonetic elements of a speaker's voice in order to help mimic the user's voice. A voice recognition module records and analyzes an effective amount of words or phrases spoken by the speaker in order to synthesize words with the speaker's mannerisms in accordance with the speaker's auditory attributes. For example, the voice recognition module could detect a speaker's pitch, speed of talking, intonation, and/or average audio frequency, and could synthesize speech that emulates one or more of such auditory attributes. In an exemplary embodiment, a speaker could "train" the voice recognition module by reciting key sentences, words, phrases, or phonemes into a microphone on the device. In another embodiment, the voice recognition module could continuously record auditory attributes of the speaker's voice while in use, continuously modifying the synthesized voice over time such that the synthesized voice grows closer to the speaker's voice the longer the speaker uses the device. In a preferred embodiment, the device automatically synthesizes the translated phrase using the auditory attributes of the speaker's voice. However, since a given device might be trained to emulate the voices of many different speakers, a user interface could be presented whereupon a user could select one of a plurality of speakers to emulate.

The voice recognition module also preferably detects the speaking language and/or the speaking dialect of the speaker. As used herein, a dialect is a method of pronouncing a language that is specific to a culture or a region. For example, dialects of English include Southern, Bostonian, British, Australian, and South African while dialects of Chinese include Mandarin, Cantonese, and Shanghainese. A dialect may also contain slang words that are specific to a region that are not used in other areas. A user interface to the voice recognition module may be provided to allow a user to manually select a speaker dialect. This is particularly useful when a speaker's dialect may be similar to another dialect of the same language.

The device also preferably has a voice filter module that filters out ambient sounds generated by non-speaker objects. As used herein, a "non-speaker object" is any object that generates sounds that is not the speaker. For example, a second speaker, an engine, wind, music, or a fan. Sounds generated by non-speaker objects could be filtered from an audio recording through any number of methods. For example, the device could detect a region that a speaker is located in and could then filter out ambient sounds generated outside the speaker's region. The region could be a static region that is defined by a user of the device, or the region could move with the speaker as the device tracks the speaker's location. The device could also "lock onto" the speaker by tracking a speaker's voice signature, and could filter out ambient sounds that are do not share attributes of the voice signature. In this manner, a recording could be made by the device that only records words and phrases made by the speaker.

The device could also have a dialect detector which will automatically select a dialect to translate the speaker's words/phrases into based upon a location of the device, based upon a detected dialect of a listener, or based upon a user's selection of a target dialect. The location of the device could be obtained in a multitude of ways, for example by triangulating the user's position based upon wireless signals such as GPS signals, by communicating with a triangulation device, by a user selection of the location, or by receiving a location signal from a wireless service such as Wi-Fi or Bluetooth®. The device could also select a target dialect by recording a portion of speech spoken by a listener, and by detecting the dialect of the listener.

The speaker's words are translated by a translation module that translates a word or phrase spoken by the speaker into a corresponding word or phrase of a different language—typically the dialect selected by the dialect detector. A preferred device contains at least 100, 300, 500, or even 1000 languages, and contains at least 500, 1000, 5000, or even 10000 different dialects to translate phrases to and from. In a preferred embodiment, the device first locks onto a speaker's voice by and filters out ambient sounds generated by non-speaker objects to obtain a "pure" stream of words spoken by the locked-on speaker. The dialect detector module could then automatically select a dialect based upon a location of the device, translating the speaker's words into a local dialect, and synthesizing a translated phrase that mimics the auditory attributes of the speaker's voice, such that it sounds like the speaker is actually talking in the local dialect. This is particularly useful for travelers who are roaming in remote areas where multiple local dialects are spoken, who need to communicate with local citizens who may not speak the traveler's language.

The device is preferably a handheld translator with one or more microphones, speakers, processors, memories, and user interfaces that allow two users to converse with one another while speaking different languages. The device preferably translates each user's word instantaneously as the user speaks, but in a common embodiment, the device translates each user's word or phrase approximately 2-4 seconds after each user speaks. In an exemplary embodiment, the device may delay until a speaker finishes his/her entire phrase in order to reword the translation with proper grammar and syntax, and may require user interaction to signal that the speaker has finished a phrase. This signal could be tangible, such as a button that a speaker presses or depresses when the speaker has finished uttering a phrase, or could be auditory, such as a verbal command, "translate" or "over."

In an alternative embodiment, the universal translator could be a software that is installable onto a computer system. Such software could be installed onto a computer system to translate auditory signals from another program, for example SkyPE® or iChat™. In this manner, users who speak different languages could communicate through a computer audio or video chat program that otherwise would not provide such translation services. Preferably any computer system that the software is installed upon is internet-accessible, or at least is accessible to some wired or wireless network. The software could also be installed as an application on a smartphone, such as an Android™ system or an iPhone®, or could be installed in a radio system to allow a car that travels from one country to another to translate a foreign-speaking radio station into the driver's language. Or the software could be provided as a standard feature in any rental car for travelers from other countries. In such an embodiment, the dialect detector is likely disabled and the target dialect or target language is selected by the driver.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 2A-2D are exemplary user interfaces in accordance with one embodiment of the invention.

DETAILED DESCRIPTION

It should be noted that while the following description is drawn to a computer/server based universal translation system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including automatically translating language spoken by two people by translating each person's spoken words into a local dialect of the other person by emulating each person's speech. Since the device also allows a person to "lock onto" a specific speaker, this allows such conversations to take place in noisy areas with multiple speakers, and might even allow a user to listen in on another person's conversations during possible covert operations.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
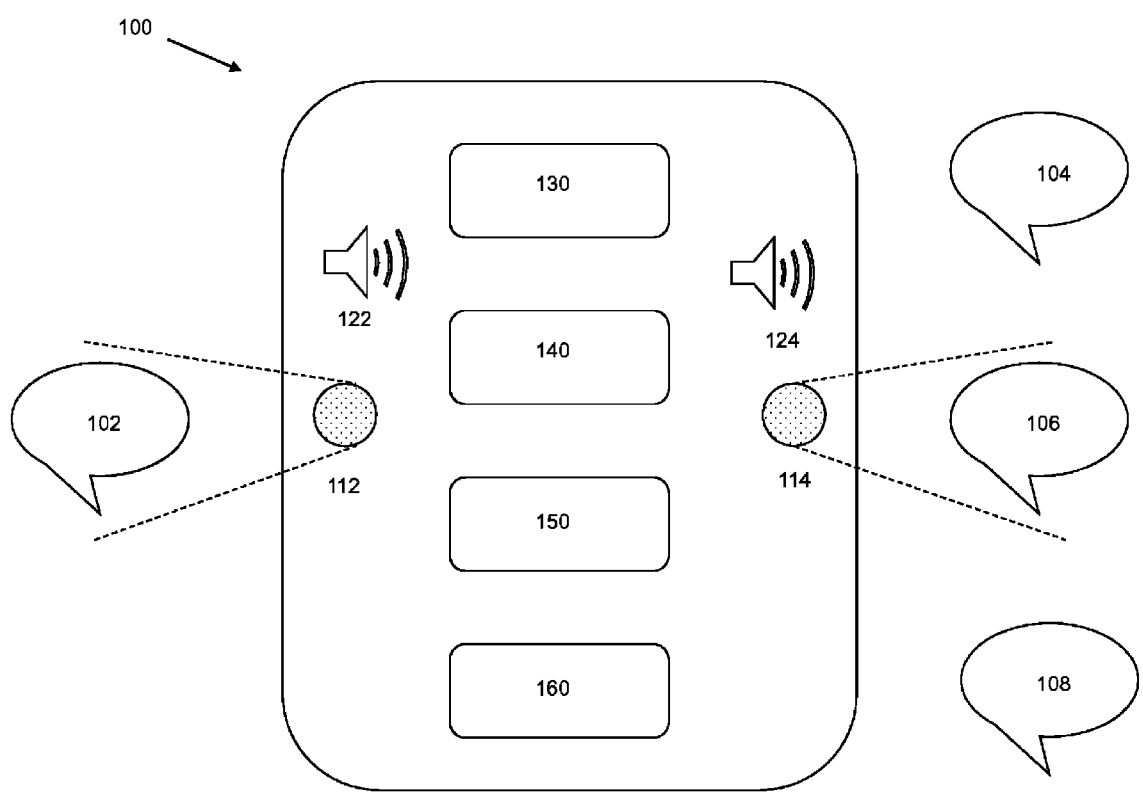
FIG. 1 is a schematic of an exemplary universal translator translating dialogue between two persons

In FIG. 1, an exemplary device 100 has directional microphones 112 and 114, auditory outputs 122 and 124, voice recognition module 130, voice filter module 140, dialect detector 150, and translation module 160. Device 100 his activated to translate speech between speaker 102 and speaker 106. Speakers 104 and 108 are sitting to either side of speaker 106. As shown, directional microphone 112 is aimed towards speaker 102 and directional microphone 114 is aimed at speaker 106 so as to prevent ambient noise from non-speakers objects, such as speakers 104 and 108. Once microphone 114 is aimed at speaker 106, device 100 could record some words/phrases spoken by speaker 106 and lock onto that speaker. When speaker 106 moves about a room, voice filter module 140 could then move directional microphone 114 to follow speaker 106, and/or could also electronically filter out ambient noise from non-speaker objects using noise-cancellation technology or other noise-filtering technology.

As speaker 102 speaks, voice recognition module 130 detects auditory attributes of speaker 102 such that auditory output 124 could synthesize one or more auditory attributes of speaker 102 when the translation is output. As mentioned above, these auditory attributes could take the form of speaker 102's tone, pitch, timber, phonemes, speed of talking, intonation, and average auditory frequency. Dialect detector 150 also preferably automatically selects a target dialect that speaker 102's words are translated into based upon the location of device 100. It is possible that the auto-selected dialect is not the specific language or dialect that speaker 106 speaks. In such an occasion, when speaker 106's speech is read by directional microphone 114, dialect detector 150 then analyzes speaker 106's speech to determine whether speaker 106's dialect is the same as, or different from, the auto-selected dialect based upon the location of device 100. If speaker 106's dialect is different, then dialect detector 150 will then auto-select the dialect spoken by speaker 106 for speaker 102's words to be translated into. All of the translation from speaker 102 to auditory output 124 and from speaker 106 to auditory output 122 is handled by translation module 160.

Exemplary user interfaces for device 100 are shown in FIGS. 2A-2D. As shown in FIG. 2A, while languages and dialects are preferably auto-selected by the device, a language and dialect could be manually selected by a user of the device. This is particularly useful when there is only one-way communication, such as when a user is translating input from a radio or from a loudspeaker. Such selections could occur for just one speaker, or both speakers who are using the system.

In FIG. 2B, a user of the device selects which speaker to listen to, when multiple voices are detected. As shown, there are four speakers: Speaker 1, Speaker 2, Speaker 3, and Speaker 4. Speaker 3 has already been recognized by the system as a speaker that has interacted with the system before, and so the name for Speaker 3 has been auto-populated to "Darcy," as that speaker's auditory attributes and mannerisms have been saved by the system. The user could first listen to each speaker's voice by pressing the "sound" symbol next to each speaker's name, and then when the user has selected the correct speaker, the device could then lock onto the chosen speaker and filter out all non-speaker sounds when translating.

In FIGS. 2C and 2D, an exemplary embodiment is shown where the device requires user input to inform the device when each speaker has started speaking, or has stopped speaking. This is particularly useful when translating highly disparate languages whose words need to be re-ordered into a completely different syntax in order to be intelligible in another language. As shown, when speaker 1 touches the "Start speaking" button, the name of Speaker 1 is then highlighted, and the "Start speaking" button then changes to a "Finished speaking" button. When the "Finished speaking" button is then pressed, the system translates the phrase spoken by speaker 1 into the language and/or dialect of Speaker 2, and Speaker 2 can then respond after pressing the "Start speaking" button.

Figure 3:
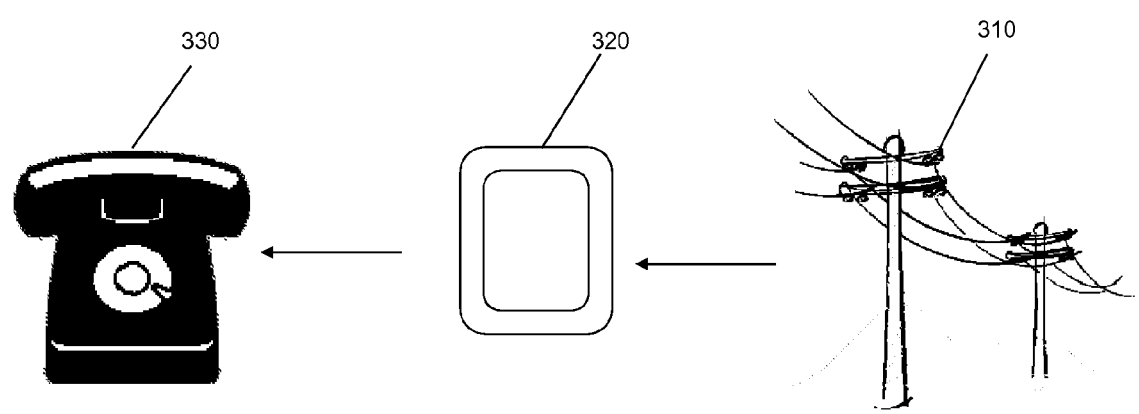
FIG. 3 is an exemplary use of a universal language translator applied to a telephone

In FIG. 3, a universal language translator 320 is interposed between two audio input/output devices 310 and 330. Audio input/output device 310 is shown here euphemistically as a telephone wire connected to a third party on the other side, and audio input/output device 330 is shown here euphemistically as a telephone. However, other input/output devices could be used, for example an audio feed could be received by a network connection to video conferencing software (e.g., Skype™) or an internet social network site, such as Facebook® or Gchat®, and a telephone, or a stationary (e.g., desktop computer, television, gaming console, etc.) or mobile computing device (e.g., laptop, smart phone, etc.) could be receiving the audio feed. In such an embodiment, the universal language translator 320 is preferably software running on the computing device, which translates the audio feed from one party to another party and modulates that translation to sound like the voice of the speaker. In a preferred embodiment, the universal language translator could be embedded as an application in a portable cellphone, allowing for a user to create modulated translated sentences on the fly with any user who is accessible via cell.

In other contemplated embodiments, the universal language translator 320 can be utilized with the transportation industry. For example, the universal language translator 320 could be interposed between an aviation control tower and an airplane, such that a pilot can interact with the control tower even without speaking the same language. In still other embodiments, the universal language translator 320 can be at least partially incorporated into a television set, such that foreign programming can be automatically translated into the viewer's language or other desired language.

By interposing the universal language translator 320 between two audio input/output sources, a party who is speaking into the universal translator can have his/her sentence analyzed, deconstructed, translated, and then reconstructed into a translated sentence that is modulated to sound like the voice of the party speaking on the other side. There might be a small delay while the translating occurs, but such a device would be invaluable in having translated conversations with a person while retaining that person's inflections and tone.

Figure 4:
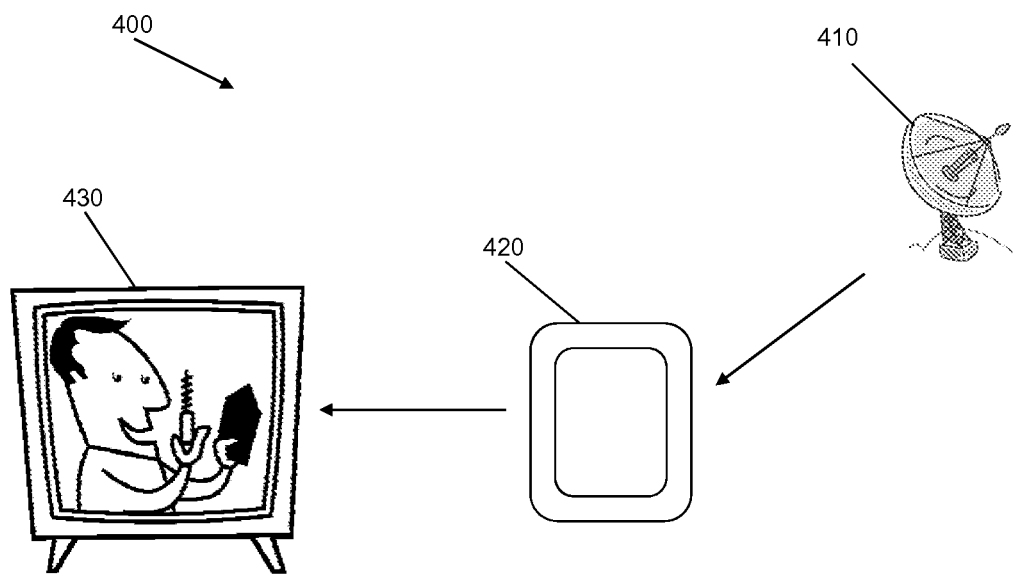
FIG. 4 is an exemplary use of a universal language translator applied to an audio/visual media.

In FIG. 4, an exemplary universal language translator 420 is interposed between an audio/visual source 410 and an audio/visual output 430. Audio/visual source 410 is shown here euphemistically as a satellite receiver, but could be any known source of audio/visual media, for example the Internet, a media player, a media diskette, or an electronic storage medium. Audio/visual output 430 is shown here euphemistically as a television, but could be any known output of audio/visual media, for example a theater, a computer monitor and speakers, or a portable media-viewing device. The universal language translator preferably buffers the audio/visual signal within a memory of the universal language translator by at least 10, 20, 30, 60, 180, or 360 seconds, to ensure that the universal language translator can reconstruct a modulated, translated sentence and output the translated sentence without allowing the audio feed and the video feed to run out of sync with one another.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A translator device, comprising:
    a microphone that receives a spoken phrase from a speaker;
    a voice recognition module that detects auditory attributes comprising a speed of talking and an average auditory frequency of the speaker from the spoken phrase;
    a dialect detector module that selects a dialect comprising slang words in a language specific to a region that are not in other dialects of the language outside the region, wherein the dialect detector module selects the dialect based upon a location of the device within the region;
    a translation module that translates the spoken phrase spoken by the speaker to a translated second phrase of the selected dialect, wherein the dialect comprises slang words in a language specific to a region that are not in other dialects of the language outside the region; and
    an auditory output module that synthesizes the translated phrase using the speed of talking and the average auditory frequency of the spoken phrase.

2. The translator device of claim 1, wherein at least one of the auditory attributes of the spoken phrase is also selected from the group consisting of pitch, and intonation.

3. The translator device of claim 1, wherein the voice filter module detects a speaker region within which the speaker is located and filters out ambient sounds generated outside the speaker region.

4. The translator device of claim 3, wherein the voice filter module moves the speaker region as the speaker moves.

5. The translator device of claim 1, wherein the voice filter module creates a voice signature for the speaker as a function of the spoken phrase and filters out ambient sounds that do not share attributes of the voice signature.

6. The translator device of claim 1, wherein the dialect detector module receives the location of the device from a GPS device.

7. The translator device of claim 1, wherein the dialect detector module receives the location of the device from a triangulation module.

8. The translator device of claim 1, wherein the microphone further records a second spoken phrase by a second speaker, and wherein the dialect detector module further selects the dialect based upon a detected dialect of the second spoken phrase.

9. The translator device of claim 1, wherein the dialect detector module has a library of at least 10000 dialects.

10. The translator device of claim 1, wherein the translation module has a library of at least 500 languages.

11. The translator device of claim 1, wherein the voice recognition module is further configured to continuously record present auditory attributes of the speaker's voice, and wherein the auditory output module is configured to continuously modify the synthesized voice over time as a function of the present auditory attributes.

12. The translator device of claim 1, wherein the dialect detector module has a library of dialects that include Southern, Bostonian, British, Australian, and South African dialects of English.

13. The translator device of claim 1, further comprising a voice filter module that filters out ambient sounds generated by a non-speaker object.

14. The translator device of claim 13, further comprising a speaker selection user interface that allows a user of the device to select which speaker to listen to when multiple voices are detected by the microphone, wherein the voice filter module filters out non-selected speakers.

\* \* \* \* \*